United States Patent [19]

Yan

[11] 4,211,576
[45] * Jul. 8, 1980

[54] PITCH AND ASPHALT COMPOSITIONS

[75] Inventor: Tsoung-Yuan Yan, Philadelphia, Pa.

[73] Assignee: Mobil Oil Corporation, New York, N.Y.

[*] Notice: The portion of the term of this patent subsequent to Feb. 13, 1996, has been disclaimed.

[21] Appl. No.: 821,255

[22] Filed: Aug. 2, 1977

Related U.S. Application Data

[63] Continuation of Ser. No. 658,985, Feb. 18, 1976, abandoned.

[51] Int. Cl.$^2$ ............... C08L 95/00; C09D 3/36
[52] U.S. Cl. ..................... 106/278; 106/273 R; 106/279; 208/22; 208/23; 208/44
[58] Field of Search ........... 106/273, 278, 279, 284, 106/273 R; 208/8, 67, 22, 23, 44; 260/28.5 AS, 33.6 A, 33.6 R, 758; 404/81, 17, 32

[56] References Cited

U.S. PATENT DOCUMENTS

| | | | |
|---|---|---|---|
| 2,092,332 | 9/1937 | Plaizier et al. | 260/758 |
| 2,470,141 | 5/1949 | Caves | 260/758 |
| 2,888,357 | 5/1959 | Pittman et al. | 106/284 |
| 3,330,759 | 7/1967 | Henschel et al. | 208/23 |
| 3,607,718 | 9/1971 | Leaders et al. | 208/10 |
| 3,642,608 | 2/1972 | Roach | 208/8 |
| 3,879,323 | 4/1975 | Van Der Loos | 260/28.5 AS |
| 3,919,148 | 11/1975 | Winters | 260/28.5 AS |
| 4,139,397 | 2/1979 | Yan | 106/278 |

*Primary Examiner*—Howard E. Schain
*Attorney, Agent, or Firm*—Charles A. Huggett; Raymond W. Barclay

[57] ABSTRACT

This invention provides a method for solubilizing scrap rubber, or coal and scrap rubber mixtures, in a highly aromatic refinery petroleum solvent to produce homogeneous compositions which have a physical state ranging from flowable pitch-like consistency to asphaltic hardness at ambient temperatures. The products of the present invention are high quality rubberized pitch and asphalt compositions which have utility in applications as caulk, mastic, adhesive, sealant and road paving compositions.

12 Claims, No Drawings

PITCH AND ASPHALT COMPOSITIONS

This application is a continuation of Ser. No. 658,985, filed Feb. 18, 1976, now abandoned.

BACKGROUND OF THE INVENTION

Within the last one hundred years, petroleum has become the overwhelming primary commodity as an organic raw material. Petroleum has had the advantages of low cost and ease of transportation and storage because of its liquid consistency. Further, petroleum is readily amenable to fractionation and conversion into a variety of valuable industrial products such as fuels, building products, chemical intermediates, and the like.

Recent international economic developments have signaled the inevitable decline of petroleum as the world's supreme industrial commodity. The price of raw petroleum has increased several fold. Also, the consumption of petroleum has been increasing exponentially and concomitantly the world petroleum supply has diminished to less than several decades of proven reserves.

Governments and industries on a priority basis are dedicating increased attention to alternatives to petroleum as sources for fuels and chemical intermediates, e.g., substantial reserves of coal exist in highly industrialized countries.

It was recognized by early workers that coal can be liquified by controlled heating in the substantial absence of oxygen. The conversion products are a liquid and a char. Because of the new compelling economic factors, the technology of coal liquefaction and gasification has been expanding at an accelerated pace. Pioneer developments in the field are represented by Lurgi and Fischer-Tropsch technology. More recent advances in coal liquefaction are described in U.S. Pat. Nos. 1,904,586; 1,955,041; 1,996,009; 2,091,354; 2,174,184; 2,714,086; 3,375,188; 3,379,638; 3,607,718; 3,640,816; 3,642,608; 3,705,092; 3,849,287; 3,870,621; inter alia.

There remains a pressing need for new technology for the conversion of coal into liquid carbonaceous products to complement and to enhance conventional petroleum derived energy and chemical applications. Innovative processes for liquefaction of coal are required which are not dependent on high pressures or reducing gases or catalysts for efficient and economic liquefaction of coal.

Further, the phenomenon of world population growth and the competition for limited natural resources have compelled governmental agencies and the academic and business communities to initiate and promulgate programs for conservation of natural resources and the stabilization of ecological factors. Reclaiming and recycling of manufactured commodities has become an overriding consideration in progressive legislation for environmental protection and control of natural resource exploitation.

Accordingly, it is an object of the present invention to provide novel manufactured petroleum products which contain substantial quantities of organic components which are not petroleum-derived raw materials.

It is another object of the present invention to upgrade low value petroleum byproduct streams from refinery operations into valuable commercial products.

It is another object of the present invention to provide a process for producing asphaltic products which contain a substantial quantity of recycled waste materials.

It is a further object of the present invention to provide an economically attractive process for liquefaction of coal.

Other objects and advantages of the present invention shall become apparent from the accompanying description and examples.

DESCRIPTION OF THE INVENTION

The present invention is concerned with a method or process for producing synthetic pitch-like substances and asphalt compositions by forming a slurry of comminuted scrap rubber with a petroleum solvent selected from thermally stable and highly refractory refinery petroleum material having a boiling point between about 650° F. and 1100° F., and heating the slurry thus formed at a temperature in the range between about 350° F. and 850° F. for a period of time sufficient to convert the slurry into a homogeneous composition having a pitch-like consistency at temperature conditions considerably below 200° F. The homogeneous composition is then mixed with asphaltenic materials to produce an asphalt forming product.

By the term "thermally stable" refinery petroleum fractions is meant a high boiling petroleum residuum such as a TCC or FCC catalytic cracker "syntower" or main column bottoms which contains a substantial proportion of polycyclic aromatic hydrocarbon constituents such as naphthalene, dimethylnaphthalene, anthracene, phenanthrene, fluorene, chrysene, pyrene perylene, diphenyl, benzothiophene, and the like. Such refractory petroleum media are very resistant to conversion to lower molecular products by conventional non-hydrogenative procedures. Typically, these petroleum refinery media-containing residua and recycle fractions are hydrocarbonaceous mixtures having an average carbon to hydrogen ratio above about 1:1, and a 5% (percent) boiling point above about 650° F.

Syntower bottoms as used herein is unlimited to identify the bottom product obtained from the product fractionation of TCC operation. Main column bottoms as used herein is intended to refer to the bottom product obtained from the product fractionation of a FCC operation. Catalyst fines may be separated from the bottoms before use.

The petroleum solvents suitable for the practice of the present invention process are thermally stable, highly polycyclic aromatic mixtures which result from one or more petroleum refining operations. Representative heavy petroleum solvents include syntower bottoms; main column bottoms; asphalt; alkane-deasphalted tar; coker gas oil; heavy cycle oil; clarified slurry oil; mixtures thereof, and the like.

The nominal properties of suitable petroleum solvents are as follows:

| Syntower Bottoms | |
|---|---|
| Sulfur | 1.13% |
| Nitrogen | 450 ppm |
| Pour Point | 50° F. |
| 5% Boiling Point | 640° F. |
| 95% Point | 905° F. |
| Conradson Carbon | 9.96 |
| Clarified Slurry Oil | |
| Sulfur | 1.04% |
| Nitrogen | 4400 ppm |
| Pour Point | 50° F. |
| 5% Boiling Point | 630° F. |

| -continued | |
|---|---|
| 95% Point | 924° F. |
| Conradson Carbon | 10.15 |
| Heavy Cycle Oil | |
| Sulfur | 1.12% |
| Nitrogen | 420 ppm |
| 5% Boiling Point | 450° F. |
| 95% Point | 752° F. |
| Conradson Carbon | 10.15 |

An FCC main column or TCC syntower bottoms refinery fraction is a highly preferred solvent for the practice of the present invention process. A typical FCC main column bottoms contains a mixture of chemical constituents as represented in the following spectrometric analysis:

| Compounds | Aromatics | Naphthenic/ Aromatics | Labile Hydrogen |
|---|---|---|---|
| Alky Benzene | 0.4 | | 0 |
| Naphthene Benzenes | | 1.0 | 0.03 |
| Dinaphthene Benzenes | | 3.7 | 0.16 |
| Naphthalenes | 0.1 | | 0 |
| Acenaphthenes, (biphenyls) | | 7.4 | 0.08 |
| Fluorenes | | 10.1 | 0.11 |
| Phenanthrenes | 13.1 | | |
| Naphthene phenanthrenes | | 11.0 | 0.18 |
| Pyrenes, fluoranthenes | 20.5 | | 0 |
| Chrysenes | 10.4 | | 0 |
| Benzofluoranthenes | 6.9 | | 0 |
| Perylenes | 5.2 | | 0 |
| Benzothiophenes | 2.4 | | |
| Dibenzothiophenes | 5.4 | | |
| Naphthobenzothiophenes | | 2.4 | 0.04 |
| Total | 64.4 | 35.6 | 0.60 |

A typical FCC main column bottoms has the following nominal analysis and properties:

| Elemental Analysis, Wt. %: | |
|---|---|
| C | 89.93 |
| H | 7.35 |
| O | 0.99 |
| N | 0.44 |
| S | 1.09 |
| Total | 99.80 |
| Pour Point, °F.: 50 | |
| CCR, %: 9.96 | |
| Distillation: | |
| IBP, °F.: 490 | |
| 5%, °F.: 640 | |
| 95%, °F.: 905 | |

FCC "main column" bottoms are obtained by separating the product of catalytic cracking of gas oil boiling above 650° F. in the presence of a solid porous catalyst. A more complete description of the production of this petroleum fraction is disclosed in U.S. Pat. No. 3,725,240.

It has been found that a highly refractory bottoms product fraction of fluid catalytic cracking (FCC) is an excellent solvent for coal, and the like, because it has a labile hydrogen content of about 0.3 percent or more, a benzylic hydrogen ($\alpha$) content of about 1.5 percent or more, an aromatic hydrogen content of about 2 percent or more, and a content of $\beta,\gamma$ and other hydrogen of about 4 percent or less.

The comminuted scrap rubber which is admixed with the petroleum solvent in the invention process preferably is selected from natural and synthetic hydrocarbon rubbers. These rubbers are generally non-oil resistant and asphalt soluble, and can be either vulcanized or unvulcanized. While it is possible to employ new and unused elastomeric materials as the rubber component in the present invention compositions, it is particularly advantageous to employ "scrap" or "reclaimed" rubber for economic reasons and for purposes of environmental protection. As employed herein, the term "scrap" rubber is meant to include "reclaimed" rubber.

Suitable rubbers include natural rubber, isoprene rubber, butadiene rubber, butadiene-styrene rubber, butyl rubber, ethylene-propylene rubber, and the like.

The rubber component can be in the form of (1) ground whole tire rubber (with or without carcass fibers); (2) unprocessed rubber buffings, i.e., a byproduct of tire retreading; (3) ground inner tubes; (4) reclaimed rubber; (5) partially devulcanized reclaimed rubber; and the like.

The reclaimed rubber can be devulcanized or partially devulcanized and can be prepared by the digester process, Heater or Pan process, Lancaster-Banbury process, and other conventional reclaiming processes as more fully described in U.S. Pat. No. 3,891,585.

Whole tire rubber can be ground, screened, decontaminated, and treated to remove metal, cord and fabric therefrom prior to usage in the invention process. However, it is also contemplated that the whole used tire carcasses be comminuted and employed directly without any prior treatment.

The comminuted scrap rubber component can be introduced into the reaction system in the form of a fine powder having a particle size in the range between about 40 mesh and 200 mesh. A process for production of finely powdered scrap rubber is disclosed in U.S. Pat. No. 2,853,742. It is also convenient and practical to employ the scrap rubber in the form of shredded or diced material. The particle size of the shaped rubber cubes or pellets can range from about 0.05 inch to about 0.5 inch in dimensions.

In the invention process, the thermally stable petroleum solvent component performs as a solvent medium with respect to the solubilization of the comminuted scrap rubber. The petroleum solvent and scrap rubber components are admixed to form a slurry. The slurry thus formed is heated at a temperature in the range between about 350° F. and about 850° F., and preferably at a temperature between about 500° F. and about 800° F. The invention process can be conducted in an open system, or in a closed system under moderate or high pressures.

In the invention process, the slurry is heated for a reaction time sufficient to yield a composition which upon cooling to ambient temperatures remains homogeneous and has a pitch-like or semi-flowable consistency at temperatures in the range of below freezing up to 200° F. and thus can be used as a sealant material. The heating step of the process is conducted for a period of time between 0.2 and 3 hours, and preferably for a period of time between about 0.5 and 1.5 hours.

The petroleum solvent component in the solubilization mixture is provided in a quantity between about 0.5 and 50 parts by weight per part by weight of the comminuted scrap rubber component. Normally, the preferred ratio will be in the range between about 1 and 20 parts by weight of petroleum solvent per part by weight of scrap rubber. Typical compositions will contain between about 5 and 30 weight percent rubber.

The process in accordance with the present invention can produce a wide variety of rubberized pitch like sealant compositions and asphalt compositions as discussed below.

The pitch compositions exhibit excellent elasticity and adhesiveness over a wide temperature range of −20° F. up to about 200° F. These compositions are suitable for use as sealing materials, pipe wrapping, impregnating compounds, pipe lining compounds, and for the production of roofing felt and insulating materials, and the like. They are also suitable for producing asphalt compositions.

A particularly outstanding type of asphalt composition is produced in accordance with the present invention process by heating and solubilizing an admixture of scrap rubber in petroleum solvent above defined and mixing with the homogeneous composition thus obtained an asphaltenic material derived from coal, petroleum and wood. A propane-deasphalted tar may be used also. Optionally, the scrap rubber first can be solubilized in the main tower or syntower bottoms petroleum solvent medium to provide a homogeneous stock solution, and thereafter the stock solution and an asphaltenic material or a petroleum tar can be heated together to yield the desired asphalt composition.

The asphalt compositions produced by the present invention exhibit advantageous low temperature ductility, durability, oxidation stability, and reduced temperature susceptibility. The asphalt compositions are excellent for application as elastomeric paving repair compositions.

The asphalt compositions of the present invention having a penetration value in the range of about 40–300 (ASTM D-549) and are obtained by the addition of a proper level of asphaltenes derived from coal, solvent refined coal and wood. They are suitable as binders in conventional road building practice. If required, the hardness of the present invention asphalt composition can be modified by air-blowing, with and without the presence of a catalyst such as phosphorus pentoxide or zinc chloride. The preferred asphalt compositions have a ring and ball softening point in the range of about 150° F. to 185° F., and a ductility of more than 100 centimeters at 77° F. (ASTM D 113-44).

In another embodiment, an improved road paving composition can be produced by incorporating the homogeneous pitch or an asphalt composition produced as herein provided as an additive in the known and more conventional paving grade asphalt binder. For example, the ductility, durability and adhesiveness of a Buffalo AC-10 asphalt binder can be improved by heating and solubilizing therein between about 5 and 50 weight percent of the rubberized pitch or asphaltic composition produced therewith.

In yet another embodiment, this invention is concerned with producing a new class of valuable pitch and asphalt compositions by forming a slurry of comminuted scrap rubber and coal with a petroleum solvent herein defined and selected from thermally stable refinery petroleum fractions having a boiling point between about 450° F. and 1100° F., and heating the slurry thus formed at a temperature in the range between about 350° F. and about 850° F. for a period of time sufficient to convert the slurry into a homogeneous composition having the desired pitch-like asphaltic properties at temperatures less than 200° F.

In the process combination of this invention, the ratio of scrap rubber to coal being solubilized varies in the range between about 0.01 and 10 parts by weight of scrap rubber per part by weight of coal, and preferably is in the range between about 0.05 and 5 parts by weight of scrap rubber per part by weight of coal.

The petroleum solvent component of the slurry is provided in a quantity between about 0.1 and 50 parts by weight of petroleum solvent per part of the combined weight of scrap rubber and coal components in the slurry admixture. On the average, the preferred ratio will be in the range between about 0.5 and 20 parts by weight of petroleum solvent per part by weight of the scrap rubber and coal.

The nominal analyses of various coals suitable for use in the invention process are as follows:

| High Volatile A | |
|---|---|
| Sulfur | 1.33% |
| Nitrogen | 1.63 |
| Oxygen | 7.79 |
| Carbon | 80.88 |
| Hydrogen | 5.33 |
| Ash | 2.77 |
| Sub Bituminous | |
| Sulfur | 0.21% |
| Nitrogen | 0.88 |
| Oxygen | 15.60 |
| Carbon | 65.53 |
| Hydrogen | 5.70 |
| Ash | 3.99 |
| Lignite | |
| Sulfur | 0.53% |
| Nitrogen | 0.74 |
| Oxygen | 32.04 |
| Carbon | 54.38 |
| Hydrogen | 5.42 |
| Ash | 5.78 |

Because of the presence of coal in the admixture being solubilized, it can be advantageous to conduct the heating and solubilization of the admixture under a pressure of about 100 and 2000 psi of hydrogen.

If desired, comminuted wood can also be incorporated in the process mixture as an additional component, or in substitution for part or all of the coal component. Hence, a homogeneous pitch and/or an asphalt compositions can be produced by heating and solubilizing an admixture comprising on a weight basis about 5–20 percent comminuted scrap rubber, 10–30 percent comminuted coal, 10–30 percent comminuted wood (e.g., pin oak), and 20–75 percent of petroleum solvent herein identified such as syntower bottoms of main column bottoms.

In the practice of the present invention process, after the admixture of petroleum solvent and other components have been heated for a sufficient period of time to product a homogeneous composition in a fluid state, and before cooling, the homogeneous composition can be further subjected to a separation operation as by filtration, centrifugation, settling, or the like procedure, to separate the liquid phase of the composition from any remaining solids of ash or other insoluble materials which may be suspended in the composition. This technique is useful for upgrading the pitch and asphalt compositions for production of bitumen paints, coatings, adhesives, and other high value commercial products.

Having thus described the present invention, no undue restrictions are to be imposed by reasons thereof except as defined by the following claims.

I claim:

1. A process for producing an improved pitch composition which comprises forming a slurry by admixing comminuted scrap rubber with a petroleum solvent selected from thermally stable highly refractory petroleum refinery FCC main column bottoms and TCC syntower bottoms having a boiling point between about 650° F. and 1100° F., wherein the petroleum solvent has a labile hydrogen content of about 0.3 percent or more, a benzyl hydrogen ($\alpha$) content of about 1.5 percent or more, an aromatic hydrogen content of about 2 percent or more, and a content of $\beta,\gamma$ and other hydrogen of about 4 percent or less; and heating said slurry at a temperature in the range between about 350° F. and 850° F. for a period of time between about 0.2 and 3 hours sufficient to convert the slurry into a homogeneous composition having a soft pitch-like consistency at temperatures in the range of −20° F. up to about 200° F.

2. A process in accordance with claim 1 wherein the petroleum solvent component in the slurry admixture is present in a quantity between about 0.5 and 50 parts by weight of petroleum solvent per part by weight of scrap rubber.

3. A homogeneous pitch composition produced in accordance with the process of claim 1.

4. A process for producing a synthetic asphalt composition which comprises (1) forming a slurry by admixing comminuted scrap rubber with a petroleum solvent selected from thermally stable highly refractory petroleum refinery FCC main column bottoms and TCC syntower bottoms having a boiling point between about 650° F. and 1100° F., wherein the petroleum solvent has a labile hydrogen content of about 0.3 percent or more, a benzyl hydrogen ($\alpha$) content of about 1.5 percent or more, an aromatic hydrogen content of about 2 percent or more, and a content of $\beta, \gamma$ and other hydrogen of about 4 percent or less; (2) heating said slurry at a temperature in the range between about 350° F. and 850° F. for a period of time between about 0.2 and 3 hours sufficient to convert the slurry into a homogeneous pitch-like composition; and (3) blending the pitch-like composition with asphaltenic material derived from coal, petroleum and wood to produce a synthetic asphalt composition having an ASTM penetration value of about 40–300 at 77° F., and an ASTM ductility of more than 100 centimeters at 77° F.

5. A process in accordance with claim 4 wherein the ratio of scrap rubber to asphaltenic material varies in the range between about 0.01 and 10 parts by weight.

6. A process in accordance with claim 4 wherein the petroleum solvent component is employed in a quantity between about 0.5 and 50 parts by weight of petroleum solvent per part of the combined weight of scrap rubber and asphaltenic material in the asphalt composition.

7. A synthetic asphalt composition produced in accordance with the process of claim 4.

8. A road paving binder composition which comprises a homogeneous solubilized blend of a paving grade asphalt and between about 5 and 50 weight percent, based on total binder composition weight, of the synthetic asphalt composition of claim 7.

9. A process for producing an improved pitch composition which comprises forming a slurry by admixing comminuted scrap rubber and coal with a petroleum solvent selected from thermally stable highly refractory petroleum refinery FCC main column bottoms and TCC syntower bottoms having a boiling point between about 650° F. and 1100° F., wherein the petroleum solvent has a labile hydrogen content of about 0.3 percent or more, a benzyl hydrogen ($\alpha$) content of about 1.5 percent or more, an aromatic hydrogen content of about 2 percent or more, and a content of $\beta,\gamma$ and other hydrogen of about 4 percent or less; and heating said slurry at a temperature in the range between about 350° F. and 850° F. for a period of time between about 0.2 and 3 hours sufficient to convert the slurry into a homogeneous composition having a soft pitch-like consistency at temperatures in the range of −20° F. up to about 200° F.

10. A process in accordance with claim 9 wherein the ratio of scrap rubber to coal being solubilized is in the range between about 0.01 and 10 parts by weight of scrap rubber per part by weight of coal.

11. A homogeneous pitch composition produced in accordance with the process of claim 9.

12. A process for producing an improved pitch composition which comprises forming a slurry by admixing on a weight basis about 5–20 percent comminuted scrap rubber, 10–30 percent comminuted coal, 10–30 percent comminuted wood, and 20–75 percent of a petroleum solvent selected from thermally stable highly refractory petroleum refinery FCC main column bottoms and TCC syntower bottoms having a boiling point between about 650° F. and 1100° F., wherein the petroleum solvent has a labile hydrogen content of about 0.3 percent or more, a benzyl hydrogen ($\alpha$) content of about 1.5 percent or more, an aromatic hydrogen content of about 2 percent or more, and a content of $\beta,\gamma$ and other hydrogen of about 4 percent or less; and heating said slurry at a temperature in the range between about 350° F. and 850° F. for a period of time between about 0.2 and 3 hours sufficient to convert the slurry into a homogeneous composition having a soft pitch-like consistency at temperatures in the range of −20° F. up to about 200° F.

* * * * *